US009424256B2

(12) United States Patent
Elseth et al.

(10) Patent No.: US 9,424,256 B2
(45) Date of Patent: Aug. 23, 2016

(54) METHOD AND APPARATUS FOR PERFORMING TYPE-AWARE CHANGE TRACKING IN A DOCUMENT

(75) Inventors: Paul Elseth, Washougal, WA (US); Carl D. Grice, Portland, OR (US)

(73) Assignee: Apple Inc., Cupertino, CA (US)

( * ) Notice: Subject to any disclaimer, the term of this patent is extended or adjusted under 35 U.S.C. 154(b) by 219 days.

(21) Appl. No.: 12/283,817

(22) Filed: Sep. 15, 2008

(65) Prior Publication Data

US 2010/0094815 A1    Apr. 15, 2010

(51) Int. Cl.
*G06F 7/00*     (2006.01)
*G06F 17/30*    (2006.01)

(52) U.S. Cl.
CPC .... *G06F 17/30011* (2013.01); *G06F 17/30368* (2013.01)

(58) Field of Classification Search
CPC ................................ G06F 17/30368
USPC ........................................ 707/756
See application file for complete search history.

(56) References Cited

U.S. PATENT DOCUMENTS

| 6,189,016 | B1 * | 2/2001 | Cabrera et al. | |
| 6,199,082 | B1 * | 3/2001 | Ferrel et al. | 715/205 |
| 6,738,973 | B1 * | 5/2004 | Rekimoto | 718/104 |
| 2006/0107251 | A1 * | 5/2006 | Boshier et al. | 717/108 |

OTHER PUBLICATIONS

Florida Gulf Coast University, "Track Changes", http://www.fgcu.edu/support/office2007/word/changes.asp, 2007.

* cited by examiner

*Primary Examiner* — Ajith Jacob
(74) *Attorney, Agent, or Firm* — Blank Rome LLP

(57) ABSTRACT

One embodiment of the present invention provides a system that facilitates performing type-aware change tracking in a document. During operation, the system receives from a user a command which changes a content of an object in the document. In response to the command, the system determines a type of the object. Next, the system modifies the content of the object according to the type of the object. The system then creates a history of the modification. Finally, the system displays the history of the modification to the user.

16 Claims, 4 Drawing Sheets
(1 of 4 Drawing Sheet(s) Filed in Color)

METHOD AND APPARATUS FOR PERFORMING TYPE-AWARE CHANGE TRACKING IN A DOCUMENT

BACKGROUND

1. Field of the Invention

The present invention relates to electronic documents. More specifically, the present invention relates to a method and an apparatus for facilitating type-aware change tracking in a document.

2. Related Art

People often collaborate in creating and modifying electronic documents. In order to facilitate this collaboration, many tools have been developed which allow users to track changes in these electronic documents. However, these tools are typically inadequate for dealing with more complex changes.

One major flaw in many existing change tracking tools is that they typically treat everything as text. For example, if a user modifies the second digit of a five digit number, the tool typically will indicate that the second digit of the five digit number was changed. In reality, the entire number has changed, not just a single digit of the number as the number appears in written form.

Hence, what is needed is an improved technique for performing change tracking in an electronic document.

SUMMARY

One embodiment of the present invention provides a system that facilitates performing type-aware change tracking in a document. During operation, the system receives from a user a command which changes a content of an object in the document. In response to the command, the system determines a type of the object. Next, the system modifies the content of the object according to the type of the object. The system then creates a history of the modification. Finally, the system displays the history of the modification to the user.

In some embodiments of the present invention, the system receives from the user a second command which changes a format of the content of the object. In response to the second command, the system modifies the format of the content of the object. Next, the system creates a history of the modification to the format of the object. Finally, the system displays to the user the history of the modification to the format of the object. Note that modifications to the format of the object are tracked separately from modifications to the content of the object.

In some embodiments of the present invention, the type of the object can include one of: a table, a cell in the table, a column in the table, a row in the table, text, a number, a date, a time, a picture, and a formula.

In some embodiments of the present invention, the system receives a selection of one or more objects from the user. The system then displays to the user a history of modifications to each selected object.

In some embodiments of the present invention, the system displays to the user a summary of the history. Next, the system receives a command from the user instructing a cursor to hover over a summary of the history of modifications to an object. Finally, in response to the command, the system displays a detailed history of the modifications to the object.

In some embodiments of the present invention, the detailed history of modifications to the object can include at least one of: a time of the modification of the object; an identifier for a user that modified the object; a modification to the content of the object; a modification to the format of the object; and a modification to the type of the object.

In some embodiments of the present invention, the system displays the history of the modification of each selected object in a threaded list.

In some embodiments of the present invention, the threaded list is hierarchical, and portions of the threaded list can be expanded and collapsed.

In some embodiments of the present invention, the system color codes the threaded list to indicate which users are responsible for each modification.

In some embodiments of the present invention, the system color codes the threaded list to indicate modifications of different types.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
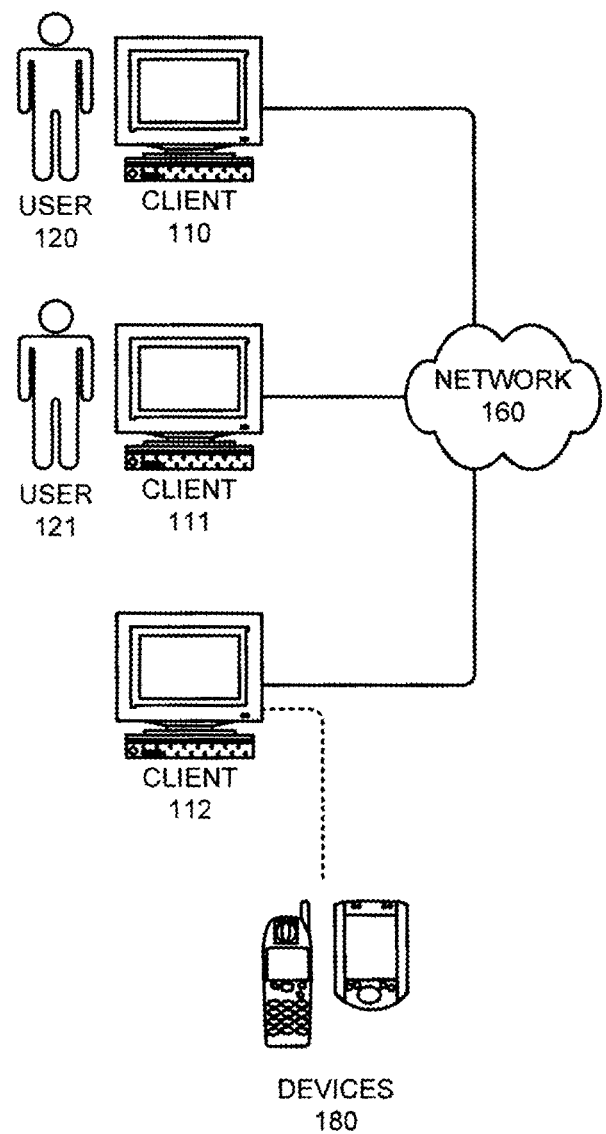
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that facilitates performing type-aware change tracking in a document. During operation, the system receives from a user a command which changes a content of an object in the document. In response to the command, the system determines a type of the object, such as "text" or "number." Next, the system modifies the content of the object according to the type of the object.

Note that different object types may have different rules for change-tracking modification. For example, if one character of a text object is changed, the system may indicate that the one character was changed. However, if one digit of a number was changed, the system may indicate that the entire number was changed, rather than indicating that one digit was changed. The system then creates a history of the modification. Finally, the system displays the history of the modification to the user.

In some embodiments of the present invention, the system receives from the user a second command which changes a format of the content of the object. In response to the second command, the system modifies the format of the content of the object. Next, the system creates a history of the modification to the format of the object. Finally, the system displays to the user the history of the modification to the format of the object.

Note that modifications to the format of the object are tracked separately from modifications to the content of the object. In many instances, users want to see all of the changes to the content of a document, but may be uninterested in changes to formatting. For example, if a user is using paragraph numbering and inserts a paragraph toward the beginning of a document, a typical change-tracking system will indicate that each subsequent paragraph number has been modified. Some embodiments of the present invention allow a user to suppress the tracking of changes to formatting while still indicating changes to content.

In some embodiments of the present invention, the type of the object can include one of: a table, a cell in the table, a column in the table, a row in the table, text, a number, a date, a time, a picture, and a formula. Note that any object type that can be classified can have its own change-tracking rules.

In some embodiments of the present invention, the system receives a selection of one or more objects from the user. The system then displays to the user a history of modifications to each selected object. For example, if a user is only interested in seeing the changes to a particular section of a document, the user may choose to view changes by selection, and then select only the particular section in question.

In some embodiments of the present invention, the system displays to the user a summary of the history. Next, the system receives a command from the user instructing a cursor to hover over a summary of the history of modifications to an object. Finally, in response to the command, the system displays a detailed history of the modifications to the object.

Note that the level of detail that can be displayed in both the summary and the detailed history of the modifications are completely customizable. For example, in one embodiment of the present invention, the system may only show the modification itself in the summary, while showing the user that performed the modification, the date and time of the modification, and any other information associated with the modification that can be captured by the system in the detailed history of the modifications.

In some embodiments of the present invention, the detailed history of modifications to the object can include at least one of: a time of the modification of the object; an identifier for a user that modified the object; a modification to the content of the object; a modification to the format of the object; and a modification to the type of the object.

In some embodiments of the present invention, the system displays the history of the modification of each selected object in a threaded list. Note that this list may be threaded on a variety of different criteria. For example, in one embodiment, the list may be threaded by the date and time of the modification. In another embodiment of the present invention, the list may be threaded by user. Note that threading may be a user-configurable option.

In some embodiments of the present invention, the threaded list is hierarchical, and portions of the threaded list can be expanded and collapsed.

In some embodiments of the present invention, the system color codes the threaded list to indicate which users are responsible for each modification, while in other embodiments of the present invention, the system color codes the threaded list to indicate modifications of different types.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, network 160, and devices 180.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Note that different embodiments of the present invention may use different system configurations, and are not limited to the system configuration illustrated in computing environment 100. In general, any device that is capable of communicating via network 160 may incorporate elements of the present invention.

Apparatus

Figure 2:
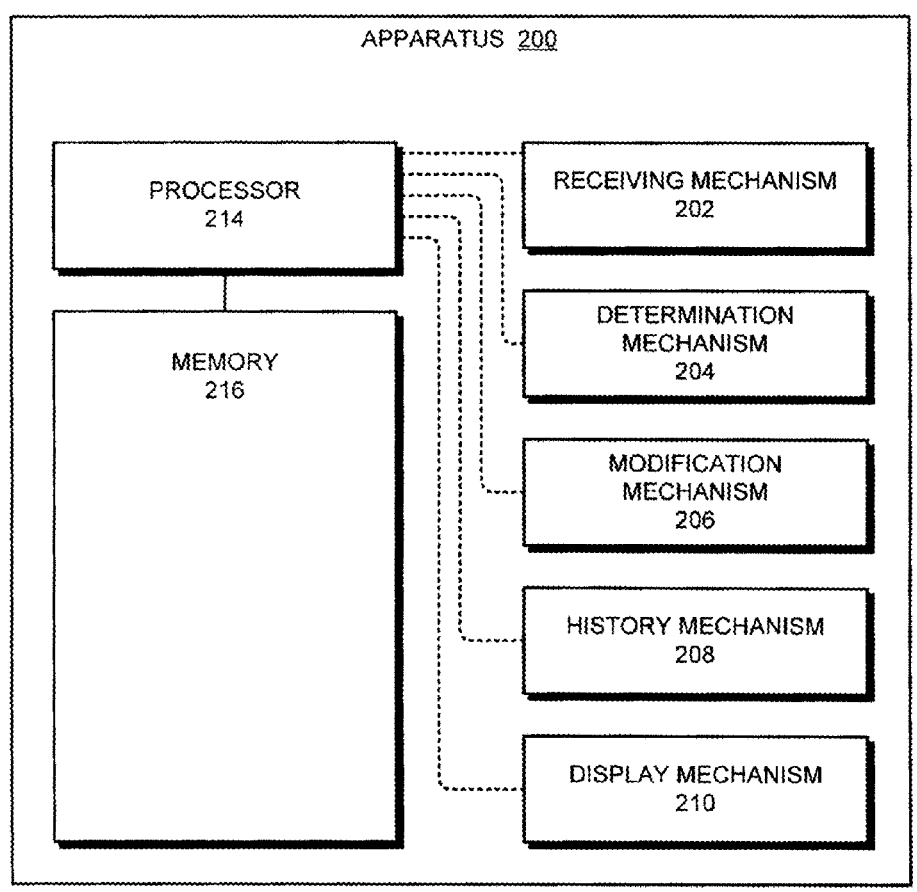
FIG. 2 illustrates an apparatus in accordance with an embodiment of the present invention.
Figure 3:
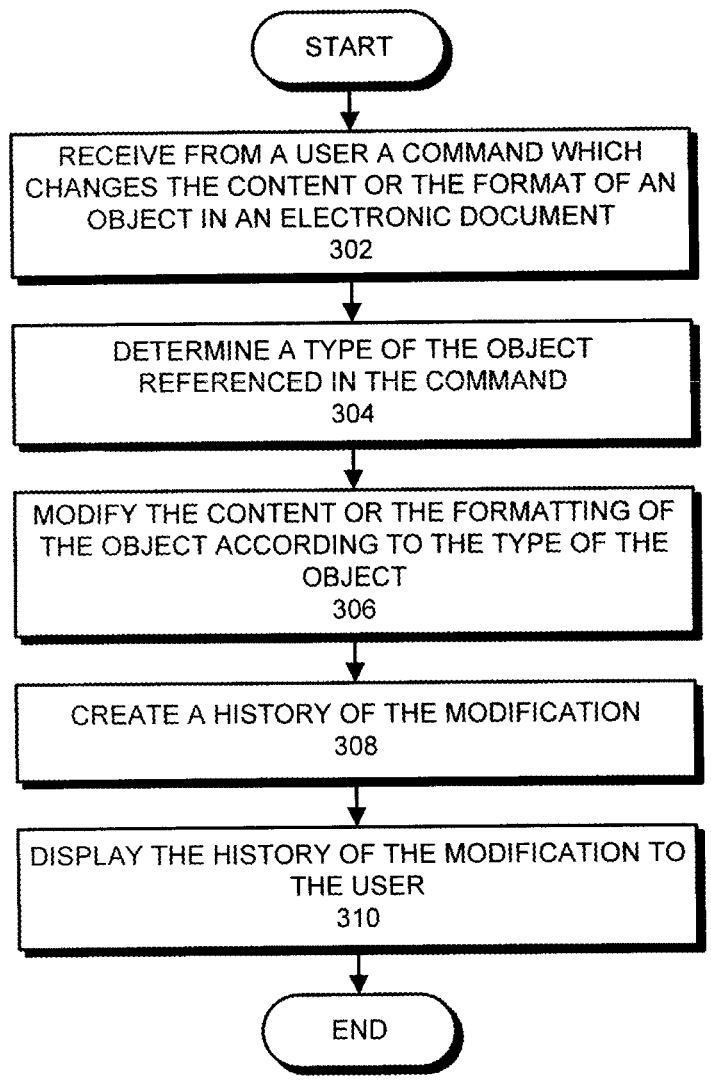
FIG. 3 presents a flow chart illustrating the process of performing type-aware change tracking in accordance with an embodiment of the present invention.

FIG. 2 illustrates an apparatus 200 in accordance with an embodiment of the present invention, and FIG. 3 presents an associated flow chart illustrating the process of performing type-aware change tracking in accordance with an embodiment of the present invention.

Apparatus 200 includes receiving mechanism 202, determination mechanism 204, modification mechanism 206, history mechanism 208, display mechanism 210, processor 214, and memory 216.

During operation, receiving mechanism 202 receives from user 120 a command which changes the content or the format of an object in an electronic document (operation 302). Next, determination mechanism 204 determines a type of the object referenced in the command (operation 304). Note that the type of the object can include one of: a table, a cell in the table, a column in the table, a row in the table, text, a number, a date, a time, a picture, and a formula. Moreover, any object type that can be classified can have its own change-tracking rules.

Once the type of the object has been determined, modification mechanism 206 modifies the content or the formatting of the object according to the type of the object (operation 306). Next, history mechanism 208 creates a history of the modification (operation 308). Finally, display mechanism 210 displays the history of the modification to user 120 (operation 310). Note that, as described previously, the system can be configured to display modifications to the content, modifications to the formatting, or both. Furthermore, the history of the modifications can be organized in a threaded list, and can be color-coded according to various criteria.

Exemplary User Interface

Figure 4:
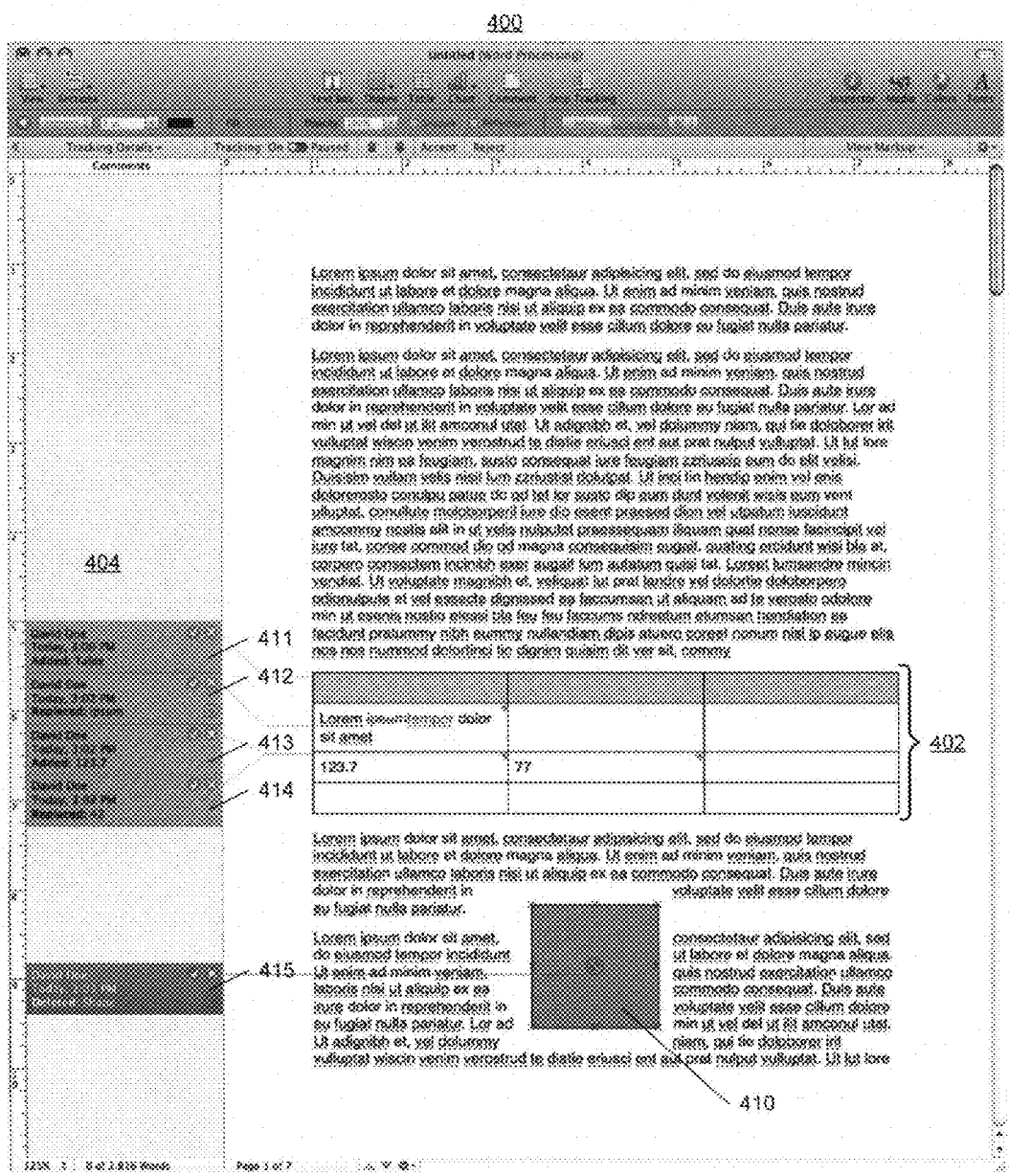
FIG. 4 illustrates a screenshot in accordance with an embodiment of the present invention.

FIG. 4 illustrates a screenshot of exemplary user interface 400 in accordance with an embodiment of the present invention. Note that user interface 400 is provided for exemplary purposes only. Embodiments of the present invention are not intended to be limited to user interface 400.

As illustrated in FIG. 4, table 402 and shape 410 have been modified while change tracking is active. In this example, change list 404 illustrates both summary and detailed histories of modifications to table 402 and shape 410. Note that while in this example, list 404 is a flat list that is color-coded by user, in some embodiments of the present invention, list 404 may be a hierarchical list and may use color to indicate other attributes.

In this example, user David Doe has modified table 402, as indicated by changes 411-414. In addition, David Doe has also removed shape 410, as illustrated by change 415. Because deleted shape 410 is currently selected in the document, corresponding change 415 appears slightly darker in color than other changes made by David Doe. In some embodiments of the present invention, changes are only shown for selected objects. For example, in some embodiments, changes 411-414 may only be visible in list 404 if table 402 is selected.

Each change in list 404 includes a checkmark icon and an "x" icon. These icons enable users to quickly accept or reject changes within the document. Furthermore, edit 412 includes an arrow icon that indicates that more change detail is available for the corresponding change. In some embodiments of the present invention, user 120 may click on the arrow icon to reveal the additional changes, while in other embodiments of the present invention, user 120 may simply hover a mouse cursor over the arrow icon to reveal the additional detail.

In some embodiments of the present invention, each level can be expanded or collapsed to reveal the level of detail required for each object that has been modified. For example, all changes to table 402 are listed in one summary change in list 402. If user 120 then clicks on the summary change in list 402, the summary expands into changes 411-414 as pictured.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing type-aware change tracking in a document, the method comprising:
   receiving a first command which changes a content of an object in the document;
   in response to the first command, determining a type of the object;
   modifying the content of the object according to the type of the object;
   receiving a second command which changes a format of the object;
   in response to the second command, modifying the format of the object;
   creating a history of the modification of the content and format of the object, wherein modifications to the content of the object are tracked separately from modifications to the format of the object;
   receiving a selection of one or more objects; and
   displaying a history of modifications to each selected object in a list.

2. The method of claim 1, wherein the type of the object can include one of:
   a table;
   a cell in the table;
   a column in the table;
   a row in the table;
   text;
   a number;
   a date;
   a time;
   a picture; and
   a formula.

3. The method of claim 1, wherein displaying to the user the history of modifications to each selected object involves displaying a summary of the history, and wherein the method further involves:
   receiving a command instructing a cursor to hover over a summary of the history of modifications to an object; and
   in response to the command, displaying a detailed history of the modifications to the object.

4. The method of claim 3, wherein the detailed history of modifications to the object can include at least one of:
   a time of the modification of the object;
   an identifier for a user that modified the object;
   a modification to the content of the object;
   a modification to the format of the object; and
   a modification to the type of the object.

5. The method of claim 1, wherein the list further comprises a threaded list.

6. The method of claim 1, wherein the list is hierarchical, and wherein portions of the list can be expanded and collapsed.

7. The method of claim 1, further comprising color coding the list to indicate which users are responsible for each modification.

8. The method of claim 1, further comprising color coding the list to indicate modifications of different types.

9. A computer-readable storage medium storing instructions that when executed by a computer cause the computer to perform a method for performing type-aware change tracking in a document, the method comprising:
- receiving a first command which changes a content of an object in the document;
- in response to the first command, determining a type of the object;
- modifying the content of the object according to the type of the object;
- receiving a second command which changes a format of the object;
- in response to the second command, modifying the format of the object;
- creating a history of the modification of the content and format of the object, wherein modifications to the content of the object are tracked separately from modifications to the format of the object;
- receiving a selection of one or more objects; and
- displaying a history of modifications to each selected object in a list.

10. The computer-readable storage medium of claim 9, wherein the type of the object can include one of:
- a table;
- a cell in the table;
- a column in the table;
- a row in the table;
- text;
- a number;
- a date;
- a time;
- a picture; and
- a formula.

11. The computer-readable storage medium of claim 9, wherein displaying the history of modifications to each selected object involves displaying a summary of the history, and wherein the method further involves:
- receiving a command instructing a cursor to hover over a summary of the history of modifications to an object; and
- in response to the command, displaying a detailed history of the modifications to the object.

12. The computer-readable storage medium of claim 11, wherein the detailed history of modifications to the object can include at least one of:
- a time of the modification of the object;
- an identifier for a user that modified the object;
- a modification to the content of the object;
- a modification to the format of the object; and
- a modification to the type of the object.

13. The computer-readable storage medium of claim 9, wherein the list further comprises a threaded list.

14. The computer-readable storage medium of claim 9, wherein the list is hierarchical, and wherein portions of the list can be expanded and collapsed.

15. The computer-readable storage medium of claim 9, wherein the method further comprises color coding the list to indicate which users are responsible for each modification.

16. An apparatus configured for performing type-aware change tracking in a document, comprising:
- a processor;
- a memory;
- a first receiving mechanism configured to receive a first command which changes a content of an object in the document;
- a determination mechanism configured to determine a type of the object in response to the first command;
- a first modification mechanism configured to modify the content of the object according to the type of the object;
- a second receiving mechanism configured to receive a second command which changes a format of the object;
- a second modification mechanism configured to modify the format of the object in response to the second command;
- a history mechanism configured to create a history of the modification of the content and format of the object, wherein the history mechanism is further configured to track modifications to the content of the object separately from modifications to the format of the object;
- a third receiving mechanism configured to receive a selection of one or more objects; and
- a display mechanism configured to display a history of modifications to each selected object in a list.

* * * * *